United States Patent [19]

Martin

[11] Patent Number: 4,556,303
[45] Date of Patent: Dec. 3, 1985

[54] CAMERA FLASH HOLDER

[75] Inventor: William A. Martin, Fairport, N.Y.

[73] Assignee: Eastman Kodak Company, Rochester, N.Y.

[21] Appl. No.: 627,178

[22] Filed: Jul. 2, 1984

[51] Int. Cl.[4] ............................................. G03B 15/03
[52] U.S. Cl. ....................................... 354/141; 362/11
[58] Field of Search ............ 354/129, 126, 141, 149.1, 354/148; 362/11, 12, 13, 3

[56] References Cited

U.S. PATENT DOCUMENTS

| | | | |
|---|---|---|---|
| 3,205,801 | 9/1965 | Peterson | 354/147 |
| 3,374,719 | 7/1965 | Horton | 354/126 |
| 3,400,261 | 9/1968 | Jacob | 354/144 X |
| 3,452,659 | 7/1969 | Von Albedyll et al. | 354/148 |
| 3,810,214 | 5/1974 | Malone et al. | 354/148 |
| 3,810,215 | 5/1974 | Armstrong | 354/148 |
| 3,941,447 | 3/1976 | Hargrave et al. | 362/3 X |
| 4,174,898 | 11/1979 | Iijima | 354/145 |
| 4,515,453 | 5/1985 | Wakabayashi et al. | 354/149.1 |

Primary Examiner—L. T. Hix
Assistant Examiner—Brian W. Brown
Attorney, Agent, or Firm—Roger A. Fields

[57] ABSTRACT

A small size camera is adapted for use with various types of flash units, such as a compact multi-lamp flash and a larger flip-flash. The various flash types are to be located in respective operative positions relative to the camera body to space them at least a minimum distance from the camera lens to substantially avoid red eye, and have distinguishable means indicative of their respective positions. The camera includes a flash holder movable to a plurality of positions, corresponding to the operative positions of the various flash types, to locate a flash unit received by the holder at least the minimum distance from the lens. Sensing means in the camera distinguishes between the indicative means of the various flash types to determine the position of the flash holder for locating a flash unit in its operative position.

7 Claims, 6 Drawing Figures

CAMERA FLASH HOLDER

BACKGROUND OF THE INVENTION

1. Field of the Invention

The invention relates generally to cameras for daylight and flash photography, and more particularly to a camera having a unique flash holder for various types of flash units.

2. Description of the Prior Art

A current trend in camera design is to make the camera bodies relatively small in size in order to increase their ease of storage, portability, handling, etc. Examples of such smaller size cameras are the 110 film cameras introduced a number of years ago and the more recently introduced disk film cameras. As a consequence of making a camera more compact, the separation between a flash unit on the camera and the photographing objective of the camera is reduced, thereby possibly creating an undesirable phenomenon commonly known as "red eye". When using a flash unit and a color print film, red eye is typified by the pupils in the eyes of a person being photographed coming out red-tinted on a developed color print. Such phenomenon is attributable to the incidence, into the photographing objective, of the red light reflected from the retinas in the person's eyes illuminated by the flash light.

Red eye may be substantially avoided by increasing the separation between the flash unit and the photographing objective. As a result, light from the flash unit will reach the eyes of a person being photographed at too great an angle to be reflected by his retinas into the photographing objective.

One approach for minimizing red eye, with a small size camera using conventional flashcubes, for example, is to provide a flash extender between the camera body and a flashcube to support the flashcube at an increased distance from the photographing objective, as shown in U.S. Pat. No. 3,810,214. A second approach for minimizing red eye, with a small size camera using disposable flashbulbs, is to provide a flash socket which is stored in a retracted position within the camera body and is movable to an extended position above the camera body for flash picture-taking, as shown in U.S. Pat. No. 3,205,801. A third approach, similar to the second one, though with a small size camera using a built-in electronic flash, is to mount the flash for movement along a recess in the camera body between a retracted (idle) position in which the flash substantially conforms with the outline of the camera body and an extended (working) position in which the flash is located above the camera body, as shown in U.S. Pat. No. 4,174,898.

While the three examples described above operate to locate a flash unit a suitable distance from the photographing objective to substantially avoid red eye, each one of the examples is able to locate only a single type or size of flash unit such distance. Thus, each one of the examples suffers from the disadvantage that it cannot be used with more than one type or size of flash unit.

SUMMARY OF THE INVENTION

As compared to the prior art examples described above, the invention advantageously provides a small size camera with the capability of using several types (e.g., sizes) of flash units, and includes means for locating the various flash types a suitable distance from the photographing objective to substantially avoid red eye.

Generally, the invention is embodied in a camera for use with various types of flash units which (a) are to be located in respective positions relative to the camera to space the individual flash types at least a minimum distance from the photographing objective to substantially avoid red eye and (b) have distinguishable means indicative of their respective positions, and comprises:

holder means for receiving the various types of flash units, said holder means having a plurality of positions corresponding to the respective positions of the various flash types for locating a flash unit received by the holder means at least the minimum distance from the photographing objective;

means supporting the holder means for movement to its respective positions; and means for distinguishing between the indicative means of the various flash types to determine the position of the holder means for locating a flash unit received by the holder means at least the minimum distance from the photographing objective.

More particularly, the invention is embodied in a camera for use with (a) a compact type flash unit which should be spaced from the camera to locate it a minimum distance from the photographing objective to substantially avoid red eye and (b) a larger type flash unit which need not be spaced from the camera to locate it the minimum distance from the photographing objective, and comprises:

means defining a cavity;

holder means for individually receiving a compact flash unit and a larger flash unit, said holder means having a retracted position at least substantially within the cavity for locating the larger flash unit at least the minimum distance from the photographing objective and having an extended position at least partially removed from the cavity for locating the compact flash unit at least the minimum distance from the photographing objective;

means supporting the holder means for movement between its retracted and extended positions;

releasable means for engaging the holder means in its retracted position;

urging means for moving the holder means to its extended position; and means for detecting a compact flash unit is received by the holder means and in response to such detection disengaging the releasable means from the holder means to allow the urging means to move the holder means to its extended position.

BRIEF DESCRIPTION OF THE DRAWINGS

The invention will be described in connection with the drawings, wherein.

DESCRIPTION OF THE PREFERRED EMBODIMENT OF THE INVENTION

The invention is described as being embodied in a disk film camera. Because such photographic cameras are well known, this description is directed in particular to camera elements forming part of or cooperating directly with the preferred embodiment. It is to be understood, however, that camera elements not specifically shown or described may take various forms known to persons of ordinary skill in the art.

Figure 1:
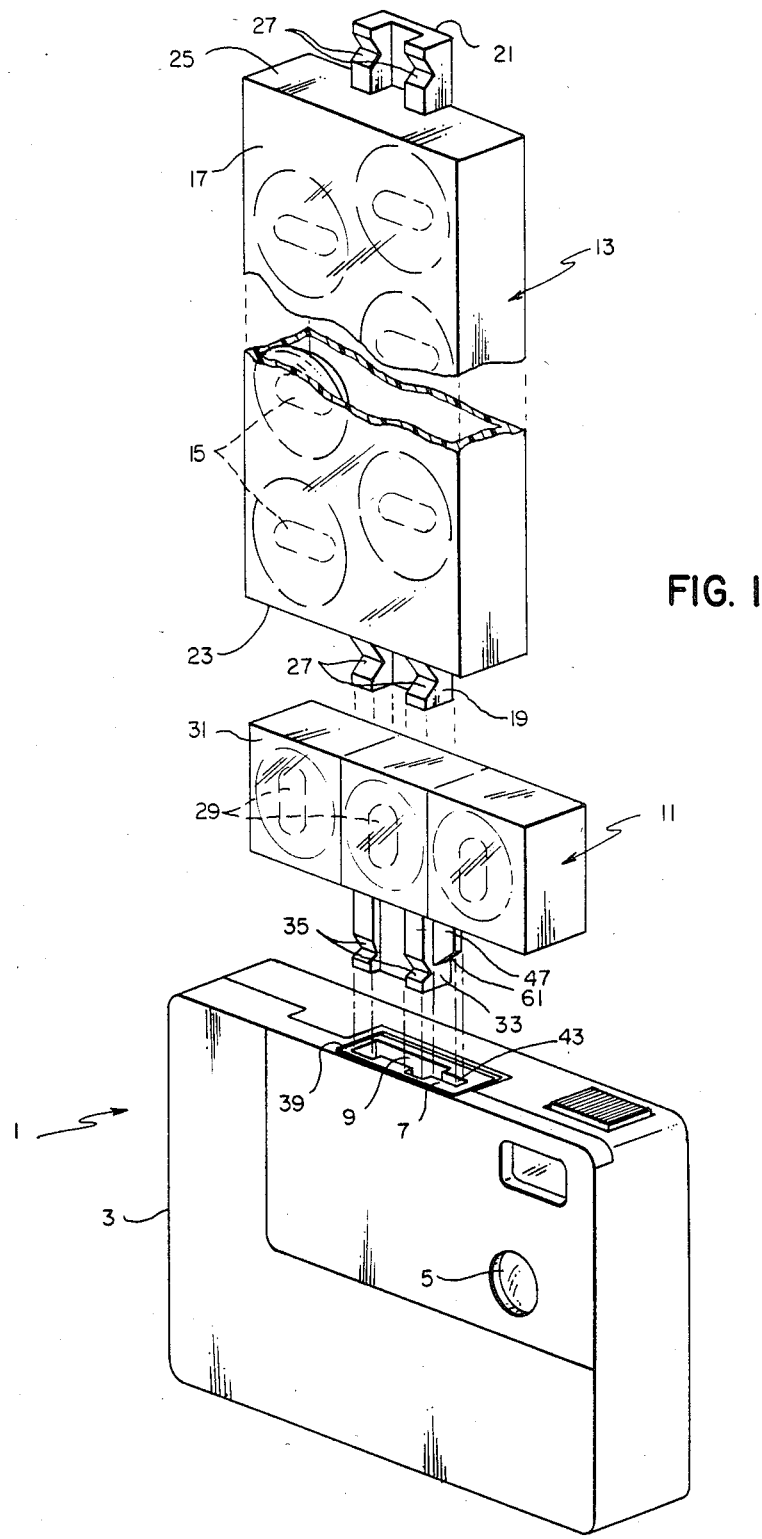
FIG. 1 is a perspective view of a disk film camera provided with an integral flash holder for receiving either a compact multi-lamp flash unit or a larger conventional flip-flash, according to a preferred embodiment of the invention.

Referring now to the drawings, FIG. 1 shows a disk film camera 1 having a housing or body 3 and a photographing objective, i.e., a lens 5. In accordance with the invention, there is provided an improved flash holder 7 integral with the camera body 3 and having a single socket 9. The socket 9 is adapted to receive two types of chemical flash arrays, which, because of their difference in design, must be located in different operative positions relative to the camera body 3 to space each one of the flash arrays at least a minimum distance from the camera lens 5 to substantially avoid red eye. As shown in FIG. 1, the first type of flash array is a compact multi-lamp flash unit 11, which is relatively small in size and therefore must be spaced from the camera body 3 to locate it at least the minimum distance from the camera lens 5 to substantially avoid red eye. The second type of flash array is a larger conventional flip-flash 13, such as manufactured by Sylvania Corp. or General Electric Co., and which, because of its design, need not be spaced from the camera body 3 to locate it the minimum distance from the camera lens 5 to substantially avoid red eye. Since the two flash units 11 and 13 will be located in different operative positions relative to the camera body 3 to space each one of them at least the minimum distance from the camera lens 5 to substantially avoid red eye, the flash holder 7 is extensible with respect to the camera body in a manner described below.

Figure 6:
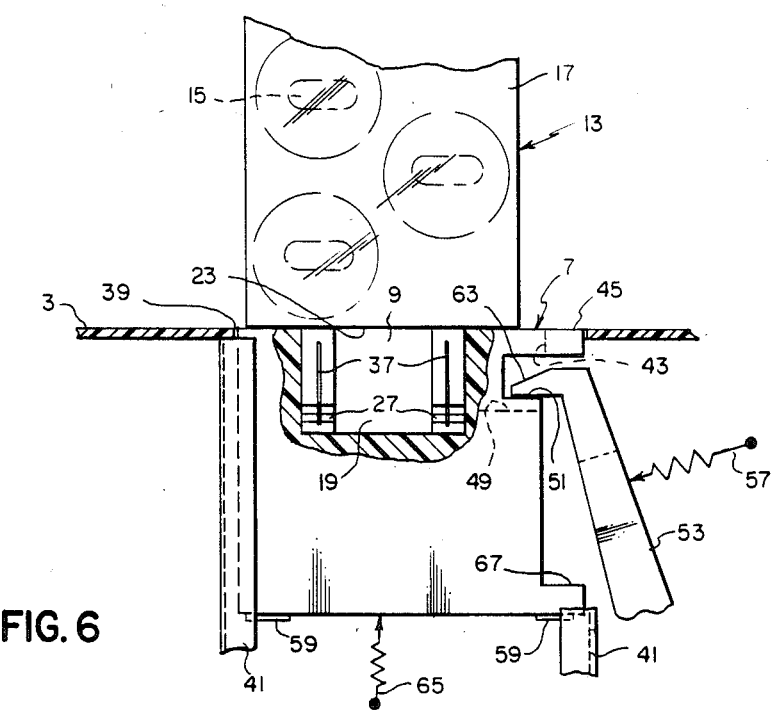
FIG. 6 is a front elevation view of the larger flip-flash and the flash holder, showing the manner of operation of the flash holder with the larger flip-flash.

The flip-flash 13 has eight flashlamps 15 located behind a front face 17 and includes respective bases 19 and 21 formed at its opposite ends 23 and 25, as shown in FIG. 1. Each of the bases 19 and 21 is identical in construction and includes a pair of engagable surfaces 27 for securing the bases individually in the socket 9 of the flash holder 7. Other details of the flip-flash 13, such as respective electrical contacts on its bases 19 and 21, although not shown in the drawings, are disclosed in commonly assigned U.S. Pat. No. 3,941,447, granted Mar. 2, 1976 to Jerry Lee Hargrave et al., and which is incorporated by reference in this application. When either one of the bases 19 and 21 are secured in the socket 9, as shown in FIG. 6, the four flashlamps 15 farthest away from the lens 5 will be fired during successive actuations of a shutter mechanism in the camera 1, thereby minimizing the possibility of red eye. The camera 1 may include a piezoelectric crystal which is struck synchronously with each actuation of the shutter mechanism to generate a pulse of electrical energy that is applied to one of the four farthest flashlamps 15. Alternatively, other flash firing means, such as a battery arrangement, may be used to fire the flash lamps. Upon the completion of the firing of the four farthest flashlamps 15, the flip-flash 13 is removed from the socket 9, inverted, and re-inserted in the socket with the four fresh lamps in proper position for firing.

The compact flash unit 11 has three flashlamps 29 located behind a front face 31 and includes a single base 33 provided with a pair of engagable surfaces 35, similar to the engagable surfaces 27 on the bases 19 and 21 of the flip-flash 13, for securing the compact flash unit to the camera body 3. Owing to this design, the compact flash unit 11 is not intended to be inverted (as is the flip-flash 13) and must be spaced from the camera body 3 to locate it at least the minimum distance from the camera lens 5 to substantially avoid red eye, as shown in FIG. 5.

Figure 2:
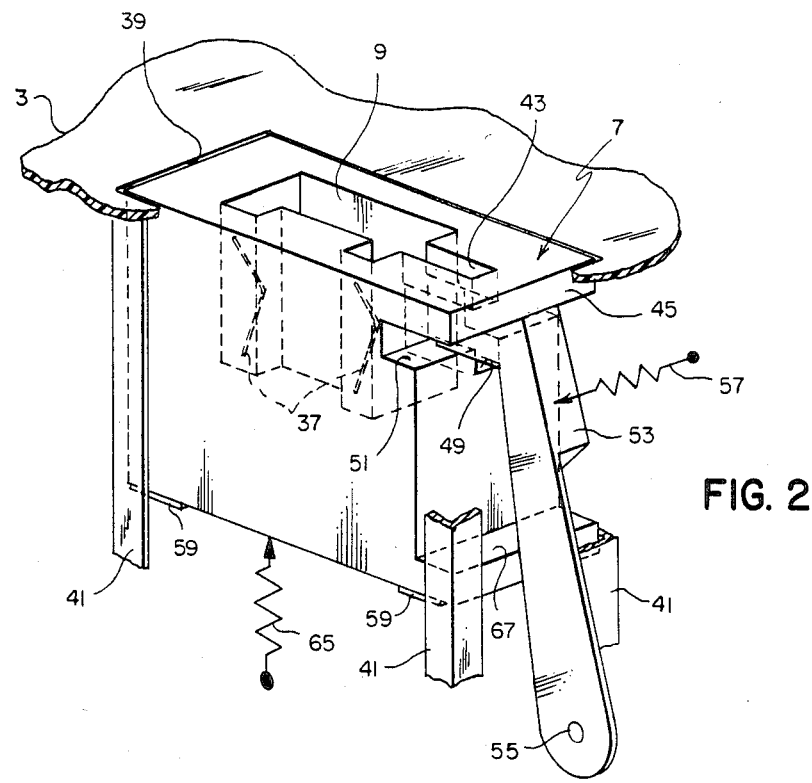
FIG. 2 is a perspective view of the flash holder, showing it in detail.

Referring now to FIG. 2, the socket 9 of the flash holder 7 is shaped to separately receive the individual bases 19 and 21 of the flip-flash 13 and the single base 33 of the compact flash unit 11. A pair of locking spring members 37 are disposed in the socket 9 for engaging respective pairs of the engagable surfaces 27 or 35 of the individual bases 19 and 21 or the single base 33, to secure the flip-flash 13 or the compact flash unit 11 to the camera body 3. Although not shown, electrical contacts connected to the flash firing means, and similar to those disclosed in the incorporated U.S. Pat. No. 3,941,447, may be provided in the socket 9 for engaging the electrical contacts on the flip-flash 13 and the compact flash unit 11.

Figure 5:
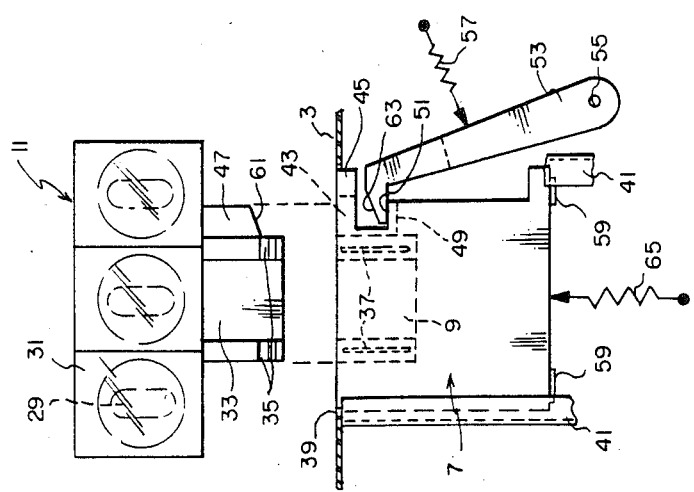

The flash holder 7 has a retracted position, shown in FIG. 6, within a cavity 39 in the camera body 3, for locating the flip-flash 13 in its operative position at least the minimum distance from the camera lens 5 to substantially avoid red eye, and has an extended position, shown in FIG. 5, partially removed from the cavity and therefore farther away from the camera lens, for locating the compact flash unit 11 in its operative position at least the minimum distance from the camera lens to substantially avoid red eye. Four corner supports 41 of the flash holder 7, only three of which are shown in FIG. 2, guide the flash holder for movement between its retracted and extended positions. Although not shown, the electrical contacts in the socket 9 of the flash holder 7, for engaging the electrical contacts on the compact flash unit 11 and the flip-flash 13, remain connected to the flash firing means regardless of whether the flash holder is in its retracted or extended position, due to the use of appropriate connection means, such as a flexible folding lead.

Figure 3:
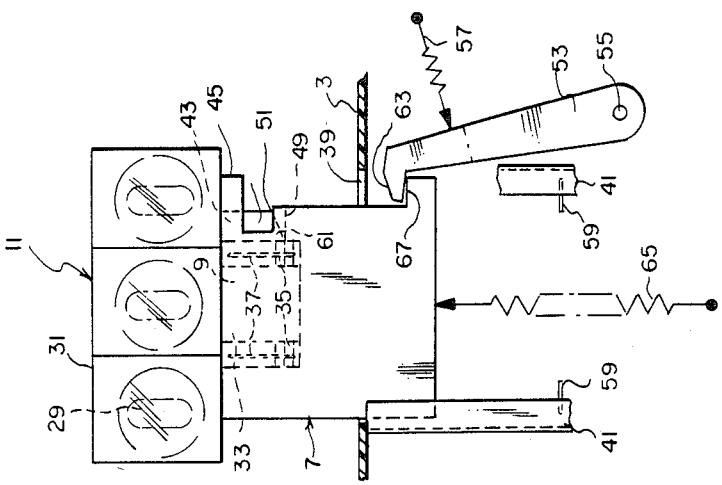
FIGS. 3, 4, and 5 are front elevation views of the compact flash unit and the flash holder, showing the manner of operation of the flash holder with the compact flash unit.
Figure 4:
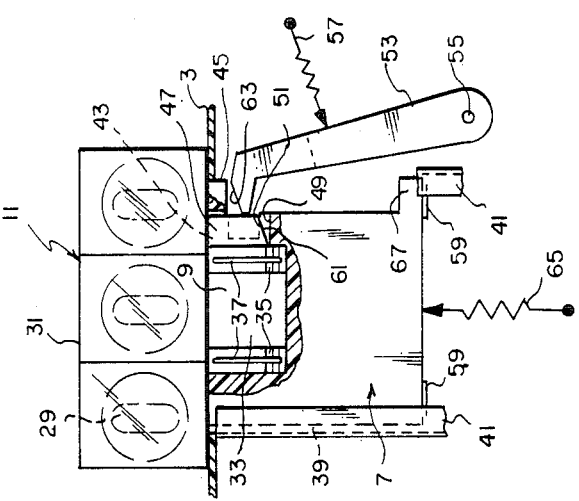

As can be seen by viewing FIGS. 2–4, the socket 9 of the flash holder 7 includes a slot-like opening 43 through an upper lip portion 45 of the flash holder for receiving an identifying tab 47. The identifying tab 47 is disposed on the single base 33 of the compact flash unit 11 to distinguish such base structurally from the individual bases 19 and 21 of the flip-flash 13. When the single base 33 of the compact flash unit 11 is received in the socket 9, as shown in FIG. 4, the identifying tab 47 will extend through the slot-like opening 43 and bottom-out partially within a cavity 49. The cavity 49 extends from the socket 9 and is formed in a ledge 51 of the flash holder 7, below the slot-like opening 43. A sensing latch 53, mounted for pivotal movement about a pin 55 secured to the camera body 3, is urged by a schematically shown spring 57 onto the ledge 51 (over the cavity 49) to releasably retain the flash holder 7 in its retracted position, as shown in FIG. 3, against four stop members 59 on the respective corner supports 41. Movement of the single base 33 of the compact flash 11 into the socket 9, causes an inclined cam surface 61 of the identifying tab 47 to bear against a corresponding inclined follower surface 63 of the sensing latch 53, thereby pivoting the sensing latch off the ledge 51 to release the flash holder 7 for movement by a schematically shown spring 65 from its retracted position to its extended position, as shown in FIGS. 4 and 5. The flash holder 7 is retained in its extended position by engagement of the sensing latch 53 with a lower lip portion 67 of the flash holder. Thus, the compact flash 11 will be located in its operative position spaced from the camera body 3 for picture-taking generally without red eye.

When either one of the bases 19 or 21 of the flip-flash 13 is received in the socket 9 of the flash holder 7, as shown in FIG. 6, the sensing latch 53 will remain on the ledge 51 of the flash holder, thereby retaining the flash holder in its retracted position. Thus, the flip-flash 13 will be located in its operative position on the camera body 3 for picture-taking without red eye.

OPERATION

In operation, the user merely inserts the single base 33 of the compact flash 11 or one of the individual bases 19 or 21 of the flip-flash 13 into the socket 9 of the flash holder 7. If the base 33 of the compact flash 11 is received in the socket 9, the presence of the identifying tab 47 on such base will cause the sensing latch 53 to release the flash holder 7 for movement with the compact flash from its retracted position in the cavity 39 in the camera body 3 to its extended position partially removed from such cavity, thereby locating the compact flash in its operative position. After the three flash-lamps 29 in the compact flash 11 have been fired, the user first separates the compact flash from the flash holder 7 and then depresses the flash holder into the cavity 39 until the sensing latch 53 re-engages the flash holder in its retracted position. If either one of the bases 19 or 21 of the flip-flash 13 is received in the socket 9, their particular structure, i.e., the absence of the identifying tab 47, will not disturb the sensing latch 53. Thus, the flash holder 7 will remain in its retracted position in the cavity 39 to locate the flip-flash 13 in its operative position.

While the invention has been described with reference to a preferred embodiment, it will be understood that various modifications can be effected within the ordinary skill in the art without departing from the scope of the invention. For example, the flash holder 7 and the sensing latch 53 may be modified to enable the flash holder to assume several extended positions corresponding to respective flash types.

I claim:

1. In a camera for use with various types of flash units which (a) are to be located in respective positions to space the individual flash types at least a minimum distance from a photographing objective to substantially avoid red eye and (b) have distinguishable means indicative of their respective positions, the combination comprising:
    holder means for receiving the various types of flash units, said holder means having a plurality of positions corresponding to the respective positions of the various flash types for locating a flash unit received by said holder means at least the minimum distance from the photographing objective;
    means supporting said holder means for movement to its respective positions; and
    means for distinguishing between the indicative means of the various flash types to determine the position of said holder means for locating a flash unit received by said holder means at least the minimum distance from the photographing objective.

2. The combination as recited in claim 1, wherein said holder means includes a single socket for receiving the various types of flash units.

3. The combination as recited in claim 1, wherein the various types of flash units include a compact unit which must be spaced from said camera to locate it the minimum distance from the photographing objective and a larger unit which need not be spaced from said camera to locate it the minimum distance from the photographing objective, and wherein said holder means has an extended position for locating the compact unit at least the minimum distance from the photographing objective and a retracted position for locating the larger unit at least the minimum distance from the photographing objective.

4. In a camera for use with a flash unit which is to be spaced at least a minimum distance from a photographing objective to substantially avoid red eye, the combination comprising:
    means defining a cavity;
    holder means having a retracted position at least partially within said cavity for receiving a flash unit and having an extended position at least partially removed from said cavity for locating the flash unit at least the minimum distance from the photographing objective;
    means supporting said holder means for movement between its retracted and extended positions; and
    means for detecting a flash unit received by said holder means and in response to such detection moving said holder means to its extended position.

5. In a camera for use with various types of flash units which are to be located in respective positions to space the individual flash types at least a minimum distance from a photographing objective to substantially avoid red eye, the combination comprising:
    holder means including a single socket for receiving the various types of flash units, said holder means having a plurality of positions corresponding to the respective positions of the various flash types for locating a flash unit received by said socket at least the minimum distance from the photographing objective; and
    means supporting said holder means for movement to its respective positions.

6. In a camera for use with a compact flash unit and a larger flash unit, each of which is to be located in a different position to space it at least a minimum distance from a photographing objective to substantially avoid red eye, the combination comprising:
    holder means for individually receiving a compact flash unit and a larger flash unit, said holder means having an extended position for locating the compact flash unit in its position spaced at least the minimum distance from the photographing objective and having a retracted position for locating the larger flash unit in its position spaced at least the minimum distance from the photographing objective;
    means supporting said holder means for movement to its extended and retracted positions; and
    means for detecting a compact type flash source is received by said holder means and in response to such detection moving said holder means to its extended position.

7. In a camera for use with (a) a compact flash unit which should be spaced from said camera to locate it a minimum distance from a photographing objective to substantially avoid red eye and (b) a larger flash unit which need not be spaced from said camera to locate it the minimum distance from the photographing objective, the combination comprising:

means defining a cavity;

holder means for individually receiving a compact flash unit and a larger flash unit, said holder means having a retracted position at least substantially within said cavity for locating the larger flash unit at least the minimum distance from the photographing objective and having an extended position at least partially removed from said cavity for locating the compact flash unit at least the minimum distance from the photographing objective;

means supporting said holder means for movement between its retracted and extended positions;

releasable means for engaging said holder means in its retracted position;

urging means for moving said holder means to its extended position; and means for detecting a compact flash unit is received by said holder means and in response to such detection disengaging said releasable means from said holder means to allow said urging means to move said holder means to its extended position.

* * * * *